United States Patent
Yoneyama

(12) 
(10) Patent No.: US 6,226,090 B1
(45) Date of Patent: May 1, 2001

(54) LIGHT TIMING PULSES GENERATING METHOD AND LIGHT TIMING CIRCUIT

(75) Inventor: Kenichi Yoneyama, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/124,869

(22) Filed: Jul. 30, 1998

(30) Foreign Application Priority Data

Jul. 30, 1997 (JP) .................................................... 9-204500

(51) Int. Cl.[7] ........................................................ G01B 9/02
(52) U.S. Cl. ............................................................ 356/450
(58) Field of Search .................................. 356/345, 450, 356/477; 372/64, 18, 25

(56) References Cited

U.S. PATENT DOCUMENTS 5,781,326 * 7/1998 Chiaroni et al. ....................... 359/237

OTHER PUBLICATIONS

Satoki Kawanishi, "Very High–Speed Optical Transmission Technology", Optoelectronics—Devices and Technologies, vol. 10, No.4, Dec. 1995, pp. 447–460.

* cited by examiner

Primary Examiner—Frank G. Font
Assistant Examiner—Andrew H. Lee
(74) Attorney, Agent, or Firm—Young & Thompson

(57) ABSTRACT

A light timing pulses generating method comprises the steps of making a non-return-to-zero (NZR) light signal diverge into two route, forming different-length optical paths for carrying two rays diverged from the light signal separately, combining these diverged rays, and generating light timing pulses by inputting the composite light to a mode locking semiconductor laser. A light timing circuit comprises a Mach-Zehnder-type optical circuit including a light divergent section, optical waveguides of different lengths, through which two rays diverged from the incident light are propagated separately, and light combining section; and a synchronous light pulses generating circuit to which the light output from the optical circuit is input. The light timing circuit may include means for monitoring and controlling the interference condition of a Mach-Zehnder interferometer.

29 Claims, 9 Drawing Sheets

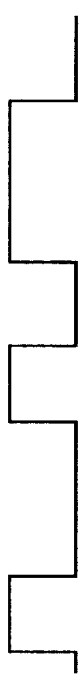 FIG.3A LIGHT DATA SIGNAL (INPUT)
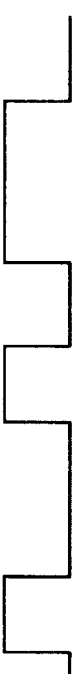 FIG.3B LIGHT DATA SIGNAL (OPTICAL PATH A)
 FIG.3C LIGHT DATA SIGNAL (OPTICAL PATH B)
 FIG.3D LIGHT OUTPUT SIGNAL
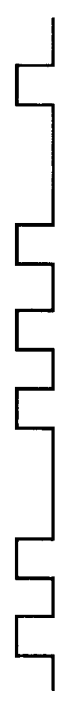 FIG.3E LIGHT OUTPUT SIGNAL
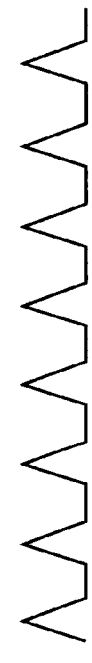 FIG.3F SYNC LIGHT TIMING PULSES (SYNC LIGHT PULSES GENERATING CIRCUIT OUTPUT)

LIGHT TIMING PULSES GENERATING METHOD AND LIGHT TIMING CIRCUIT

BACKGROUND OF THE INVENTION

1. Field of the Invention

The present invention relates to a technique of generating light timing pulses from light signals, and particularly relates to a method of generating light timing pulses from a light signal with the attribute of the signal unchanged and a circuit for implementing such method.

2. Description of the Related Art

Research attempts have been made vigorously concerning communication methods based on optical time division multiplexing (optical TDM) as future optical communicating means which could provide very high transmission rates ("Optoelectronics; Device and Technology" journal, vol. 10, No. 4, pp. 447–460, December 1995).

Because optical time division multiplexing communication methods (optical TDM methods) perform data coding according to whether or not short pulse light exists (intensity modulation), they basically use return-to-zero (RZ) type light signals. However, present mainstream optical communicating methods use non-return-to-zero (NRZ) light signals. Thus, it may be necessary for future optical time division multiplexing communication methods to have a circuit for converting currently prevailing NRZ type optical data signals into RZ type ones. In addition, a circuit for generating light timing pulses in synchronization with the NRZ type optical data signal is required to implement an optical code conversion circuit. As one of the conventional light timing pulses extracting circuits, for example, such a circuit structure is known that has been disclosed in Japanese Published Unexamined Patent Application No. Hei 5-37469. In this circuit, an incident optical signal of NRZ type is input to an optical being amplified, is and after amplified, input to an intensity modulation to frequency modulation converting circuit (IM-FM converting circuit). By means of a nonlinear optical effect, the IM-FM converting circuit converts the intensity modulated light of NRZ type optical signal into frequency modulated light with an incident ray from a semiconductor laser. By extracting this frequency modulated light through a narrow-band-pass optical filter, light timing pulses are produced.

But, the above light timing pulses extracting circuit has such a bottleneck as follows. Using the nonlinear optical effect such as optical Kerr effect, the above-mentioned IM-FM converting circuit converts the variation in the intensity of NRZ-type optical data signals into the variation in frequencies of semiconductor laser rays. In order to use such nonlinear optical effect, it is necessary to amplify an incident NRZ-type light signal up to a high power level beyond several tens of milliwats (mW) before inputting it to the IM-FM converting circuit. Thus, the optical amplifier is required that it amplifies the light signal to an extremely large extent. This causes a problem that the power consumed by the entire circuit (particularly, the power consumed by the optical amplifier) is very large. There is another problem which stable operation of the circuit is not always expected because the nonlinear optical effect itself is a very unstable phenomenon. That is, the above-mentioned light timing pulses extracting circuit is questionable in its reliability, economical feasibility and operational stability.

SUMMARY OF THE INVENTION

An object of the present invention is to provide a method of generating light timing pulses from an NRZ-type light signal and a circuit for implementing such method in a compact and simple structure that can achieve economical and stable operation and high reliability.

A light timing pulses generating method according to one aspect of the present invention comprises the steps of making a light signal diverge into two route, regulating two diverged rays such that they travel through their specific optical paths with different lengths, and combining these two diverged rays and generating light timing pulses from t he composite light. Such method according to another aspect of the present invention comprises the steps of making a light signal diverge into two route, producing a given time difference between the optical paths for two diverged rays, and combining these two diverged rays and generating light timing pulses from the composite light. The incident light signal is a non-return-to-zero (NZR) type light signal. The two diverged rays are regulated such that the difference between the lengths of their optical paths is smaller than one-bit length of the incident light signal.

Then, a light timing circuit according to one aspect of the present invention comprises an optical circuit including a divergent section which makes an incident light diverge into two routes and optical waveguides which form different-length optical paths through which the rays diverged from the incident light are propagated; and a synchronous light pulses generating circuit to which the rays output from the optical circuit are input. Such circuit according to another aspect of the present invention comprises a Mach-Zehnder interferometer having two optical paths whose light signal propagation time differs with each other, a mode locking laser which generates light timing pulses in synchronization with a cyclic frequency of a light pulse signal output from the Mach-Zehnder interferometer, monitoring means for the interference condition of the Mach-Zehnder interferometer, interference condition control means for optimally controlling the condition of the Mach-Zehnder interferometer, based on the information derived from the monitoring means. The Mach-Zehnder interferometer can be set such that a relation between propagation time difference $\Delta T$ produced when two rays diverged from a light data signal are propagated through their respective optical paths and bit rate B of the light data signal will be $(m+0.05)/B \leq \Delta T \leq (m+0.95)/B$. Besides, the propagation time difference $\Delta T$ of the Mach-Zehnder interferometer can be set such that phase difference $\Delta \phi$ between the two rays diverged from the light signal when they are combined after propagated through their respective optical paths will be integral multiples of radian $\pi$. In the latter circuit, the interference condition control means for the Mach-Zehnder interferometer is further specifically regarded as a means for setting the propagation time difference $\Delta T$ by changing the physical length or refractive index of at least one of the two optical paths. According to another feature of the present invention, the interference condition control means for the Mach-Zehnder interferometer is also regarded as combined means for applying an electric field to at least one of the two optical paths and controlling the intensity of the electric field.

The present invention can achieve incomparably economical advantage, stable operation and high reliability when light timing pulses are generated from light data signals of NRZ type according to the method and circuit noted above.

BRIEF DESCRIPTION OF THE DRAWINGS

The above and other objects, features and advantages of the present invention will become apparent from the following detailed description when taken with the accompanying drawing in which:

FIGS. 3A, 3B, 3C, 3D, 3E, and 3F show the waveforms of the light signals.

DETAILED DESCRIPTION OF THE PREFERRED EMBODIMENTS

Figure 1:
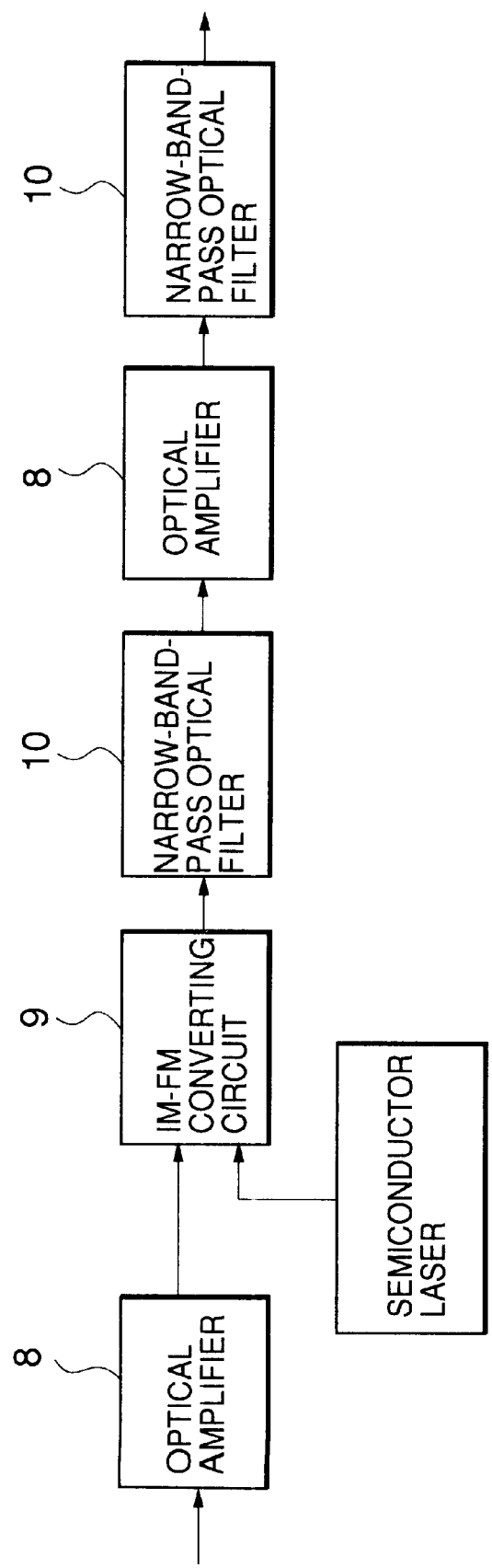
FIG. 1 is a block diagram showing a conventional light timing pulses generating circuit.

A conventional light timing pulses generating circuit is shown in FIG. 1. In this circuit, an incident light signal of NRZ type is input to an optical amplifier 8 and the signal after amplified is input to an intensity modulation to frequency modulation converting circuit (IM-FM converting circuit) 9. Another incident light is input to the IM-FM converting circuit 9 from a semiconductor laser 11. The IM-FM converting circuit 9 coverts the intensity modulated light of the NRZ-type light signal into frequency modulated light, using a nonlinear optical effect. A narrow-band-pass optical filter 10 extracts this frequency modulated light as light timing pulses. However, the circuit shown in FIG. 1 requires large power consumption and lacks reliability and stability.

Figure 2:
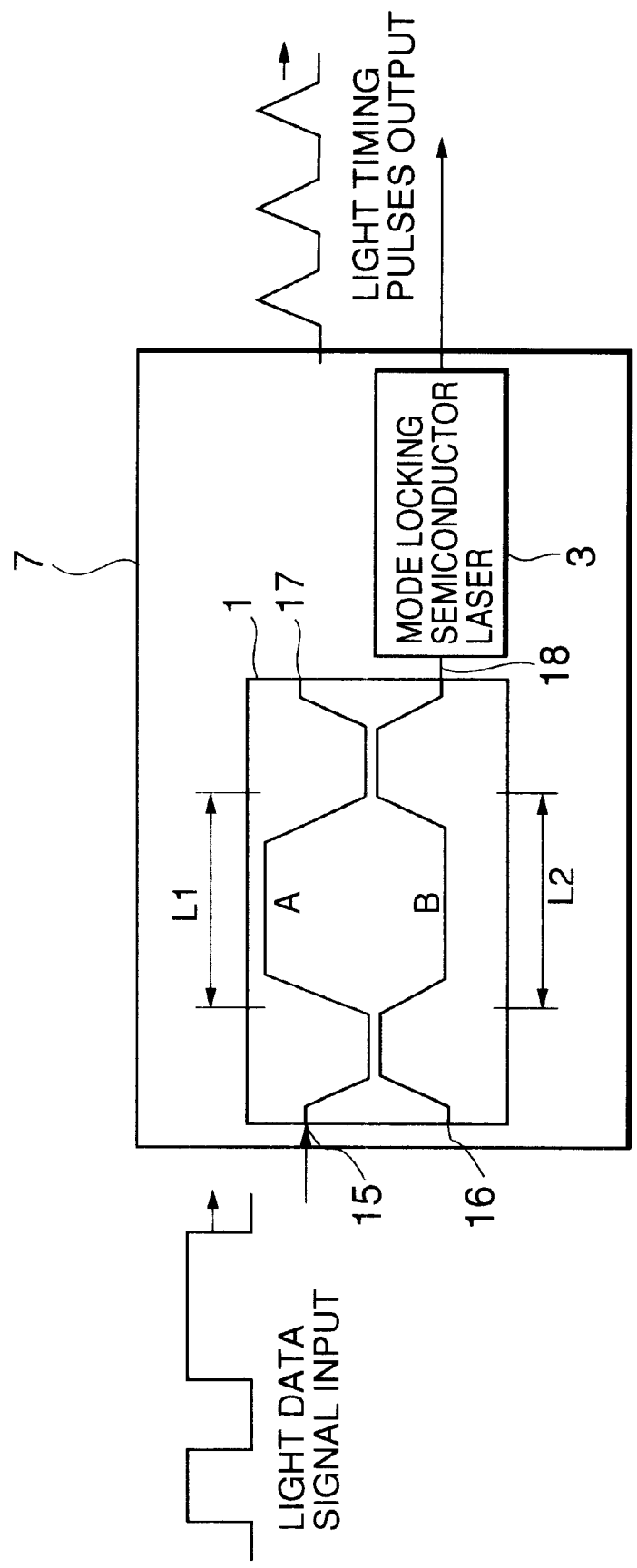
FIG. 2 is a view showing the basic structure of a light timing pulses generating circuit according to the present invention.

FIG. 2 shows a light timing pulses generating circuit according to the present invention. This light timing pulses generating circuit is structured as a light timing circuit module 7. A Mach-Zehnder-type optical circuit 1 is formed on the optical waveguide substrate. The Mach-Zehnder-type optical circuit 1 as shown is such structured that two 3-dB optical couplers are connected in series, one having two input ports and another having two output ports. A light data signal of NRZ type is input to an input port 15 of the input ports 15 and 16 of the first 3-dB optical coupler. A mode locking semiconductor laser 3 is connected to an output port 18 of the output ports 17 and 18 of the second 3-dB optical coupler. Two optical paths A and B are formed between these two 3-dB optical couplers and their lengths L1 and L2 are different. The difference between the lengths of the optical paths is set smaller than one bit length of the incident light signal to the Mach-Zehnder-type optical circuit 1. Desirably, the difference between the lengths of the optical paths, ΔL should be selected as follows. Given that bit rate is B, light velocity in the optical paths Vc, and an arbitrary integer m, a relation $(m+0.05) \times Vc/B \leq \Delta L \leq (m+0.95) \times Vc/B$ shall be fulfilled. That is, the structure of the Mach-Zehnder-type optical circuit 1 is designed such that the time difference between one ray traveling through optical path A and another ray through optical path B before they are combined will fall between 5% and 95% of one bit length. These limit values of 0.05 (5%) and 0.95 (95%) are considered as being acceptable in view of the performance of the related optical parts and devices. These values may be set more approximate to 0 and 1 (but, they must not be set to 0 or 1).

FIGS. 3A, 3B, 3C, 3D, 3E, and 3F show the waveforms of the signals operating in the above light timing pulses generating circuit. First, a light signal of NRZ type (FIG. 3A) is input to the input port 15 of the Mach-Zehnder-type optical circuit 1. This light signal diverge into two routes through the first 3-dB optical coupler and the two diverged rays travel through their optical paths A and B. Because the lengths of optical paths A and B are different as described above, a given time lag occurs between one ray (FIG. 3B) passed through path A and another ray (FIG. 3C) through path B. By way of example, FIGS. 3B and 3C represent the condition that the time difference between both corresponds to 50% of one bit length. These light signals of the rays (FIGS. 3B and 3C) are combined by the second 3-dB optical coupler and output from light output ports 17 and 18 as two light signals having the waveforms shown in FIGS. 3D and 3E respectively. Why the waveforms of these light signals are as shown in FIGS. 3D and 3E is owing to the fact that interference occurs when two signals overlap and this interference inhibits one light signal output to the output port 18 as long as another light signal is output to the output port 17. As seen from these Figs, clock frequency components equivalent to a bit rate do not exist in the incident light signal of NRZ type (FIG. 3A), whereas such components appear in the light signal (FIG. 3E) output from the light output port 18 of the Mach-Zehnder-type optical circuit 1. When the light signal shown in FIG. 3E is input as incident light to the mode locking semiconductor laser 3, this semiconductor laser 3 generates light timing pulses (FIG. 3F) at a cyclic frequency equivalent to the above clock frequency.

Figure 4:
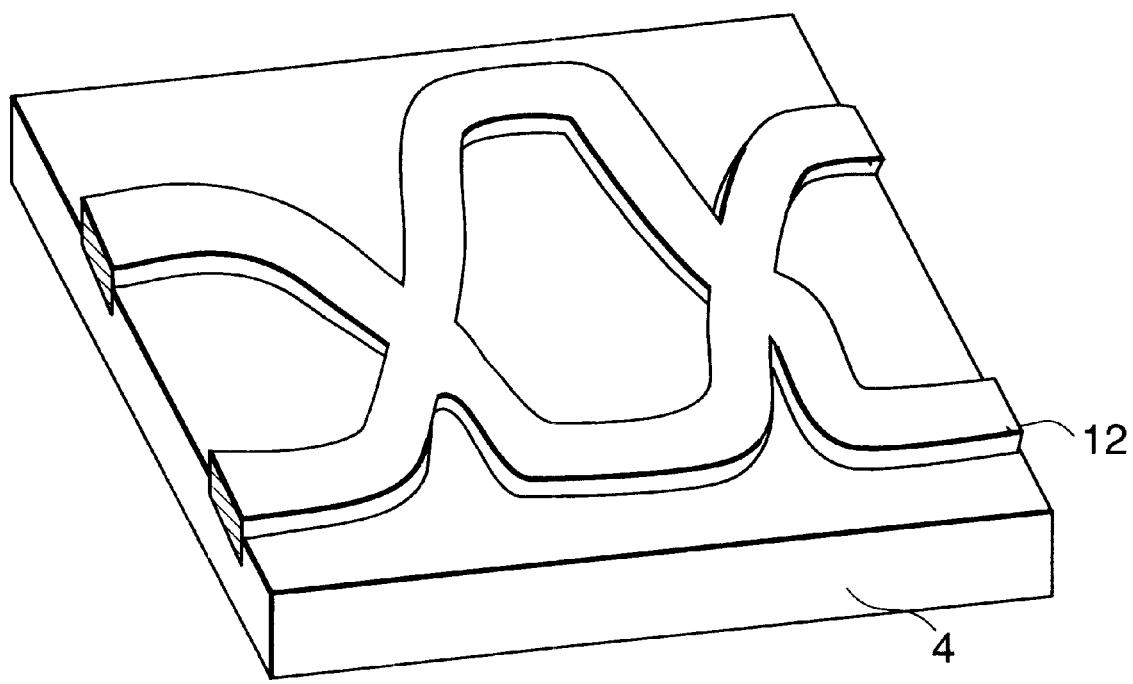
FIG. 4 is a view showing the structure of a Mach-Zehnder-type optical circuit.

The above-mentioned Mach-Zehnder-type optical circuit 1, for example, has the structure shown in FIG. 4, using an optical waveguide substrate 4 made of such material as quartz, lithiumniobate. Optical waveguides 12 can be fabricated on the substrate by means of a widely known fabrication process, such as spatter, lift-off, dry etching or thermal diffusion. As a mode locking semiconductor laser 3 (FIG. 6), a widely known device can be used; for example, a bipolar Fabry-Perot type DC-PBH semiconductor laser which provides electrically separated gain region and saturable absorption region. The active layer of this semiconductor laser, for example, has a multiple quantum well structure and is so designed that the central oscillation wavelength will be approx. 1.55 microns. The length of the saturable absorption region is designed to be 200 microns and the gain region and the separation region are approx. 10 microns. A reflector film of high reflectivity is formed on the device end face on the saturable absorption region side. An NRZ-type light signal (FIG. 3A) that is incident light, for example, has a bit rate of 2.5 or 10 gigabits per second; a bit rate of 100 gigabits per second and 1 terabits per second are expected to be possible in future. By the way, 10 gigabits per second are equivalent to a bit length of approx. 2 cm/bit, which is derived from the calculation based on the light velocity in a quartz waveguide. The light timing pulses generating method and circuit as noted above enable a compact and simple circuit structure which can achieve stable operation and high reliability of such circuit without the need of large power consumption.

Figure 5:
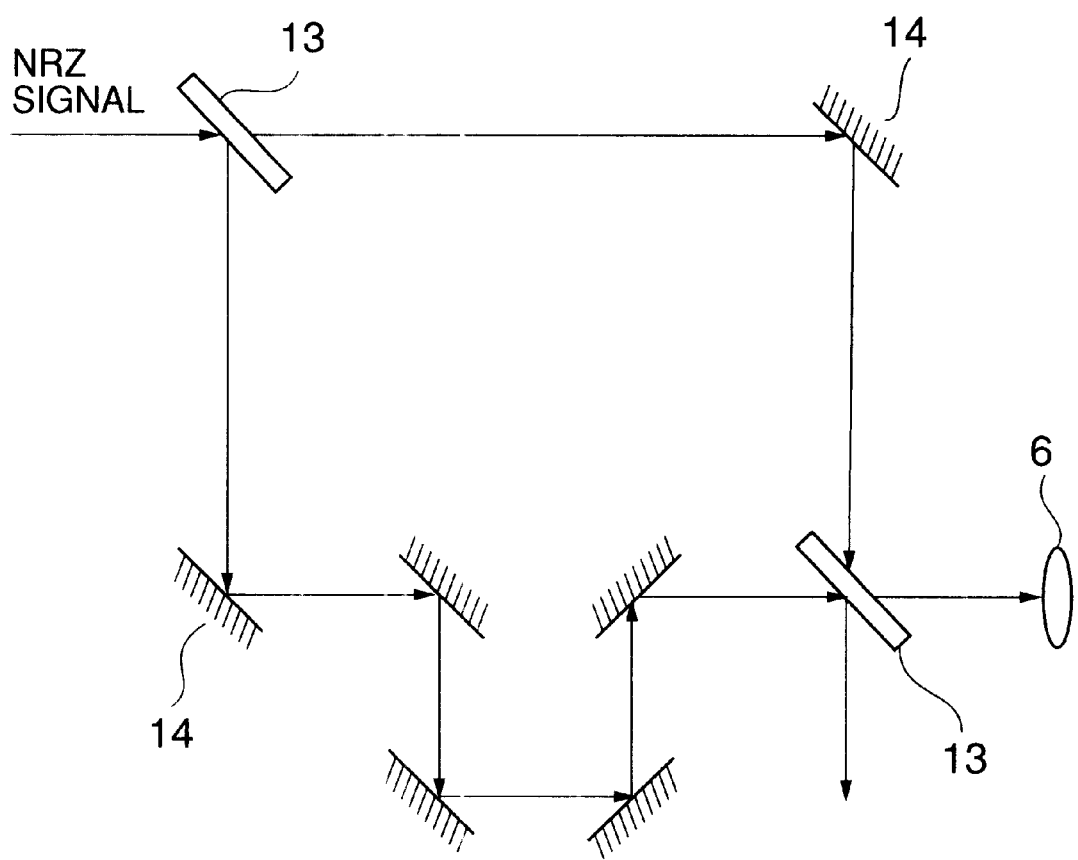
FIG. 5 is a view showing the structure of a Mach-Zehnder-type optical interferometer.
Figure 6:
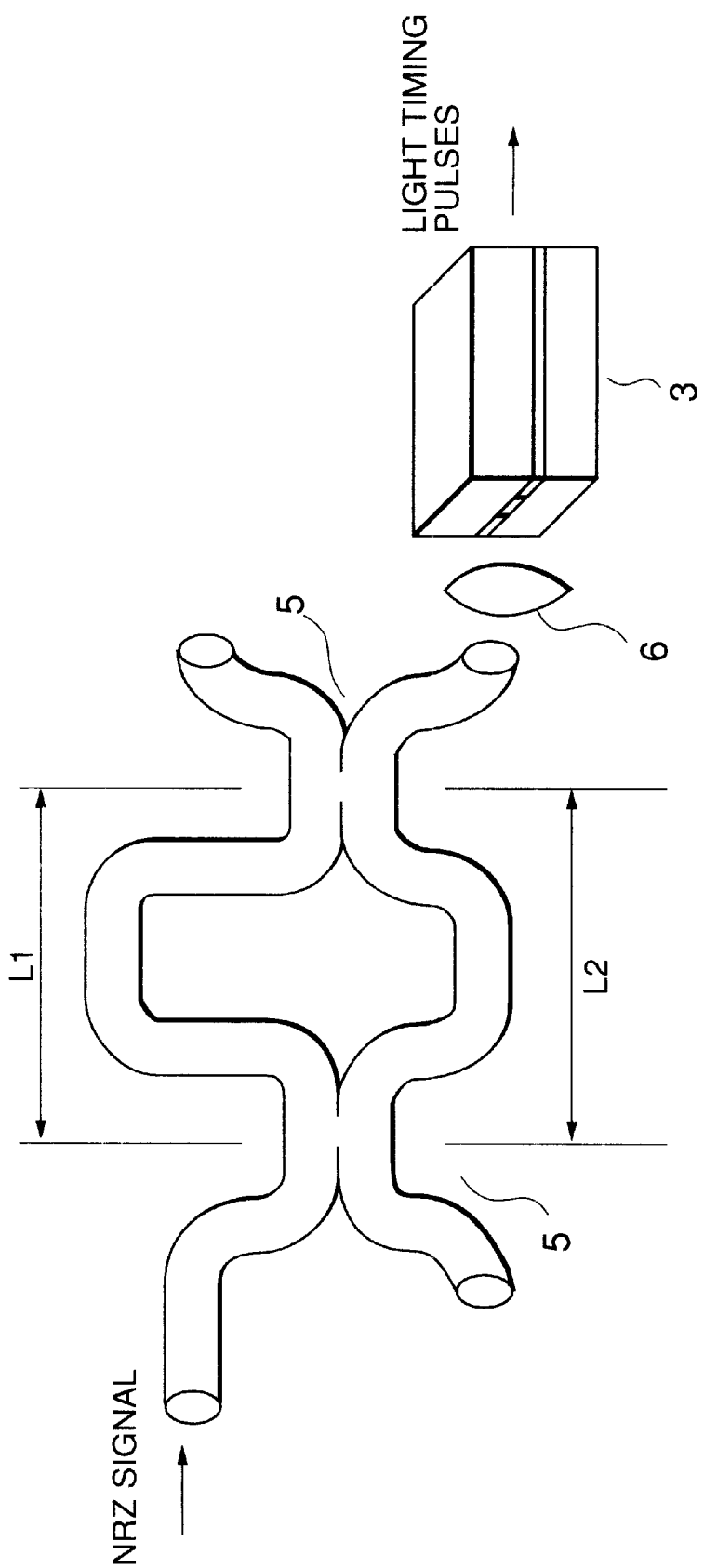
FIG. 6 is a view showing the structure of a Mach-Zehnder-type optical circuit using a fusion-type optical fiber coupler.

As another example of implementing the Mach-Zehnder-type optical circuit 1, two optical paths of different lengths can be made by using two Y-type optical couplers instead of 3-dB optical couplers. Alternatively, as shown in FIG. 5, such a structure of a Mach-Zehnder-type interferometer is available that one half mirror 13 serves to make one light path diverge into two routes, full reflecting mirrors 14 form two different optical paths, and another half mirror 13 combines the rays traveled through both paths. Furthermore, as shown in FIG. 6, two optical paths of different lengths can also be constructed by connecting two fusion-type optical fiber couplers 5 in series, each of which has two ports for light input and output. In the last case, the light output from one of the optical fiber couplers 5 passes through a beam-condensing lens 6 before input as incident light to the mode locking semiconductor laser 3. The interference stability is improved by using a polarization retentive optical fiber as the optical fiber. As another mode locking laser, a mode locking fiber ring laser can be used. Furthermore, an optical phase synchronization circuit (optical PPL) can be used. In the case of the optical phase synchronization circuit, an incident light signal and a light clock are input to a laser diode amplifier. The gain from the amplifier is modulated by the light clock signal and the gain modulated signal is extracted through an optical and-pass filter and detected by an optical diode, then an electric signal is output from a voltage controlled oscillator. This output is input as incident light to a light pulses generator of the mode locking laser and then a light signal is produced.

Figure 7:
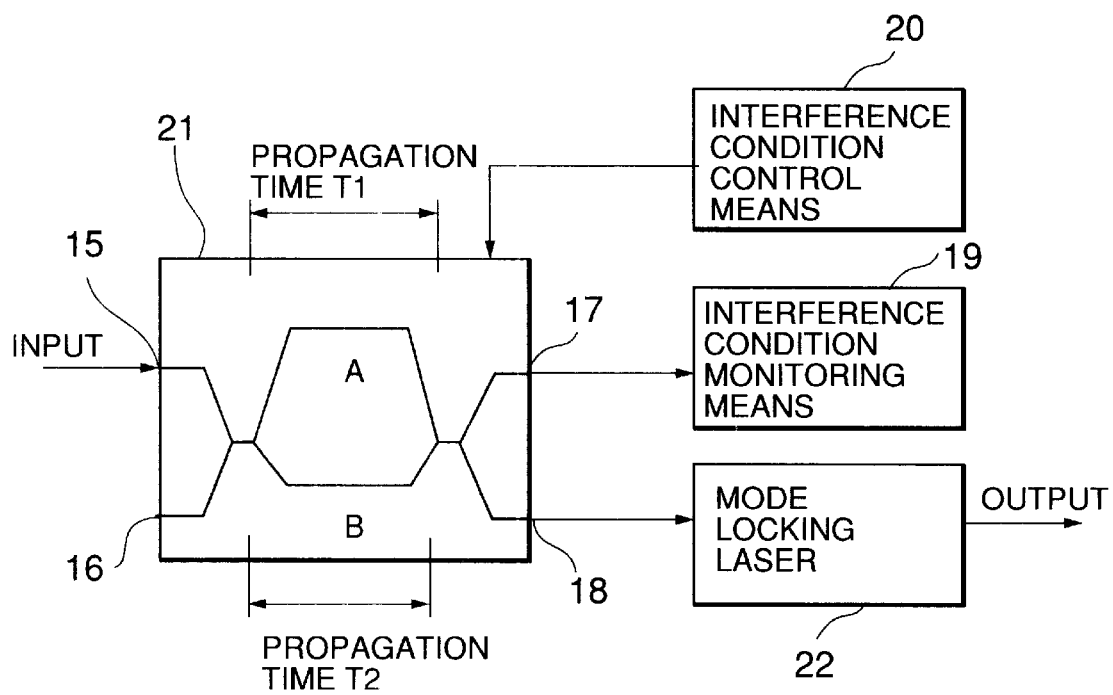
FIGS. 7, 8, and 9 all are a block diagram of a light timing pulses generating circuit according to the present invention.

FIG. 7 shows the structure of another light timing circuit. The circuit shown in FIG. 7 consists of a Mach-Zehnder interferometer 21 including two optical paths A and B whose propagation time T1 and T2 are different, a mode locking laser 22 which generates light timing pulses in synchronization with a cyclic frequency of a light pulse signal that is input to it, interference condition monitoring means 19, and interference condition control means 20. The light output from an output port 18 of the Mach-Zehnder interferometer 21 is input as incident light to the mode locking laser 22. The light output from another output port 17 is input as incident light to the interference condition monitoring means 19 which monitors the condition of the Mach-Zehnder interferometer. Monitor signals from the interference condition monitoring means 19 are sent to the interference condition control means 20. The interference condition control means 20 adjusts the interference condition in the Mach-Zehnder interferometer 21 optimally based on the monitor signals.

For the Mach-Zehnder interferometer, difference $\Delta T (\Delta T = T1-T2)$ between propagation time T1 and T2 for the two rays diverged from an incident NRZ light data signal and propagated through the two optical paths of the interferometer is set as follows: a relation between $\Delta T$ and bit rate B of the NRZ light signal will be $(m+0.05)/B \leq \Delta T \leq (m+0.95)/B$. Besides, the propagation time difference $\Delta T$ of the Mach-Zehnder interferometer is set or can be set such that phase difference $\Delta \phi$ between the two rays diverged from the NRZ light signal when they are combined after propagated through their respective optical paths will be integral multiples of radian $\pi$. As a result, a light signal having a cyclic frequency (bit rate) component of the NRZ light signal is output from a plurality of light output ports of the Mach-Zehnder interferometer. This light signal output is input to the mode locking laser 22 and light timing pulses in synchronization with the cyclic frequency (bit rate) and phase of the NRZ light signal are generated from the light output port of the mode locking laser 22. Optical paths that diverge and are combined in the Mach-Zehnder interferometer 21, shown in FIG. 7, may be formed by using prisms and half mirrors for spatial light propagation as shown in FIG. 5, constructed by optical fiber couplers as shown in FIG. 6, or constructed on the optical waveguide substrate as shown in FIG. 4.

A Mach-Zehnder interferometer (1×1) having each one input and output port can be used in place of the Mach-Zehnder interferometer (2×2), shown in FIG. 7, which has each two input and output ports. Another interferometer such as a Mickelson interferometer can also be used instead of the Mach-Zehnder interferometer. The mode locking laser 22 may be either a mode locking fiber ring laser or a mode locking semiconductor laser.

In the light timing circuit shown in FIG. 7, after the light signal including a clock frequency component is output from the output port 18 of the Mach-Zehnder interferometer 21 and input as incident light to the mode locking laser 22, the mode locking laser 22 outputs light timing pulses at a cyclic frequency equivalent to the clock frequency. FIGS. 2, 3D and 3E represents the scenario that the sum of the intensities of the two propagated rays diverged from the incident light signal (intensity sum) is output from one port 17 and the difference between the intensities of such rays (intensity difference) is output from another port 18. Which of such intensity sum and difference is output from which port, however, depends on the phase difference $\Delta \phi$ between the two rays diverged from the light signal when they are combined. The output ports, from one of which intensity sum is output and from another intensity difference is output are switched over according to whether the phase difference $\Delta \phi$ is even or odd multiples of radian $\pi$. By controlling the phase difference $\Delta \phi$ through the fine adjustment of propagation time difference $\Delta T$ from external control, it is thus possible to fix an arbitrary port that is exclusively used for either output of such intensity sum and difference. For a light timing circuit, it is important to keep propagation time difference $\Delta T$ and phase difference $\Delta \phi$ stable at all times by external control in order to maintain optimal interference condition. In the circuit shown in FIG. 7, the interference condition monitoring means 19 and the interference condition control means 20 which controls the Mach-Zehnder interferometer 21 according to the monitor signals keep the Mach-Zehnder interferometer 21 under the optimal condition and allow the circuit to generate stable light timing pulses.

Figure 8:
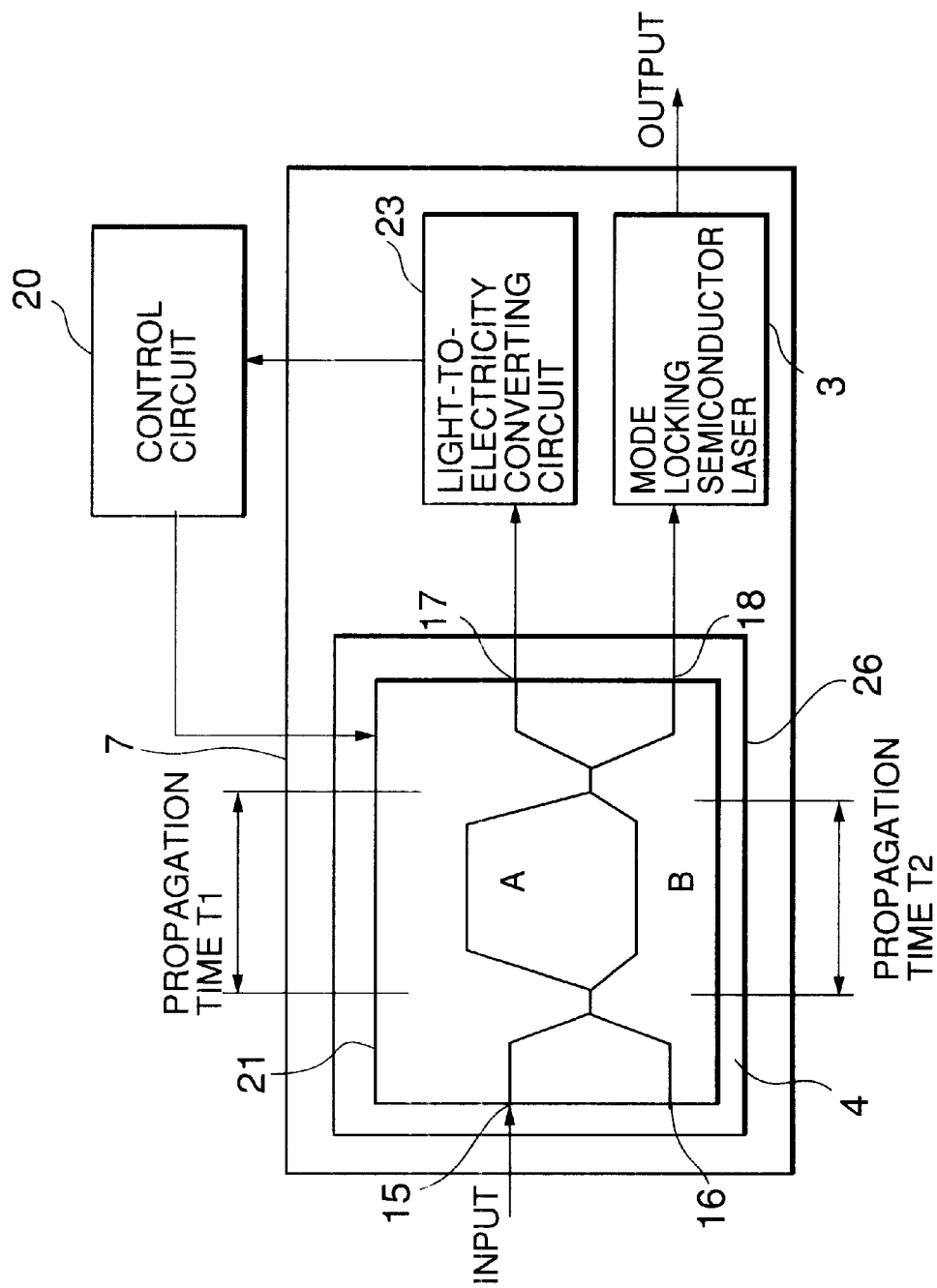

FIG. 8 shows a more detailed embodiment of the light timing circuit shown in FIG. 7. In FIG. 8, the Mach-Zehnder interferometer 21 is constructed on an optical waveguide substrate 4 and a mode locking semiconductor laser 3 is used as the mode locking laser 22. The mode locking semiconductor laser 3 is located near the optical waveguide substrate 4 so that a small-sized light timing circuit module 7 can be implemented. The substrate 4 is mounted on a heater 26 for temperature regulation. The structure of the heater 26 is so designed as to be able to heat both or either of the two optical paths of the Mach-Zehnder interferometer 21. The heater 26 shown in FIG. 8 represents a wide area under the Mach-Zehnder interferometer 21 and pins and electrodes having required shapes are arranged in this area so that heat can be applied to waveguide A and B properly. Electrodes can be assembled by embedding in the Mach-Zehnder interferometer. Alternatively, a titanium film with a thickness of 0.2 to 0.5 microns and required length and width may be formed over an approx. 1-micron buffer layer of silicon oxide which directly covers the waveguides. A light-to-electricity converting circuit 15 is connected to a port 17 of the Mach-Zehnder interferometer 21 from which the above-mentioned intensity sum of light signal is output. An electric signal output from the light-to-electricity converting circuit 15 is input to a control circuit 24 for controlling the heater 26. To a port 18 of the Mach-Zehnder interferometer 21 from which the above-mentioned intensity difference of light signal is output, the mode locking semiconductor laser 3 is connected.

For the light timing circuit shown in FIG. 8, when an incident NRZ light signal is input to the Mach-Zehnder interferometer 21, a light signal that is the above-mentioned intensity sum is output from the port 17 and a light signal that is the above-mentioned intensity difference is output from the port 18. The light signal of intensity sum from the port 17 is converted into an electric signal through the light-to-electricity converting circuit 23 and input to the control circuit 24. The control circuit 24 regulates the temperature of the heater 26 to optimize the interference condition of the light signal of intensity sum as monitored by the light-to-electricity converting circuit 23. If the heater 26 is adjusted to change the temperature of both or either of the two optical paths of the Mach-Zehnder interferometer 21, then it results in the change in the length of the paths, which in turn changes the propagation time difference $\Delta T$. In this way, subtle control of the phase difference $\Delta \phi$ between the two propagated rays diverged from the incident light signal can be performed. If the control is performed to optimize the interference condition of the light signal of intensity sum output from the port 17 of the Mach-Zehnder interferometer 21, then a good and stable output of the light signal of intensity difference with a clock frequency component is made at the port 18. When the light signal including the clock frequency component output from the port 18 is input as incident light to the mode locking semiconductor laser 3, this laser 3 outputs light timing pulses at a cyclic frequency equivalent to the clock frequency.

Figure 9:
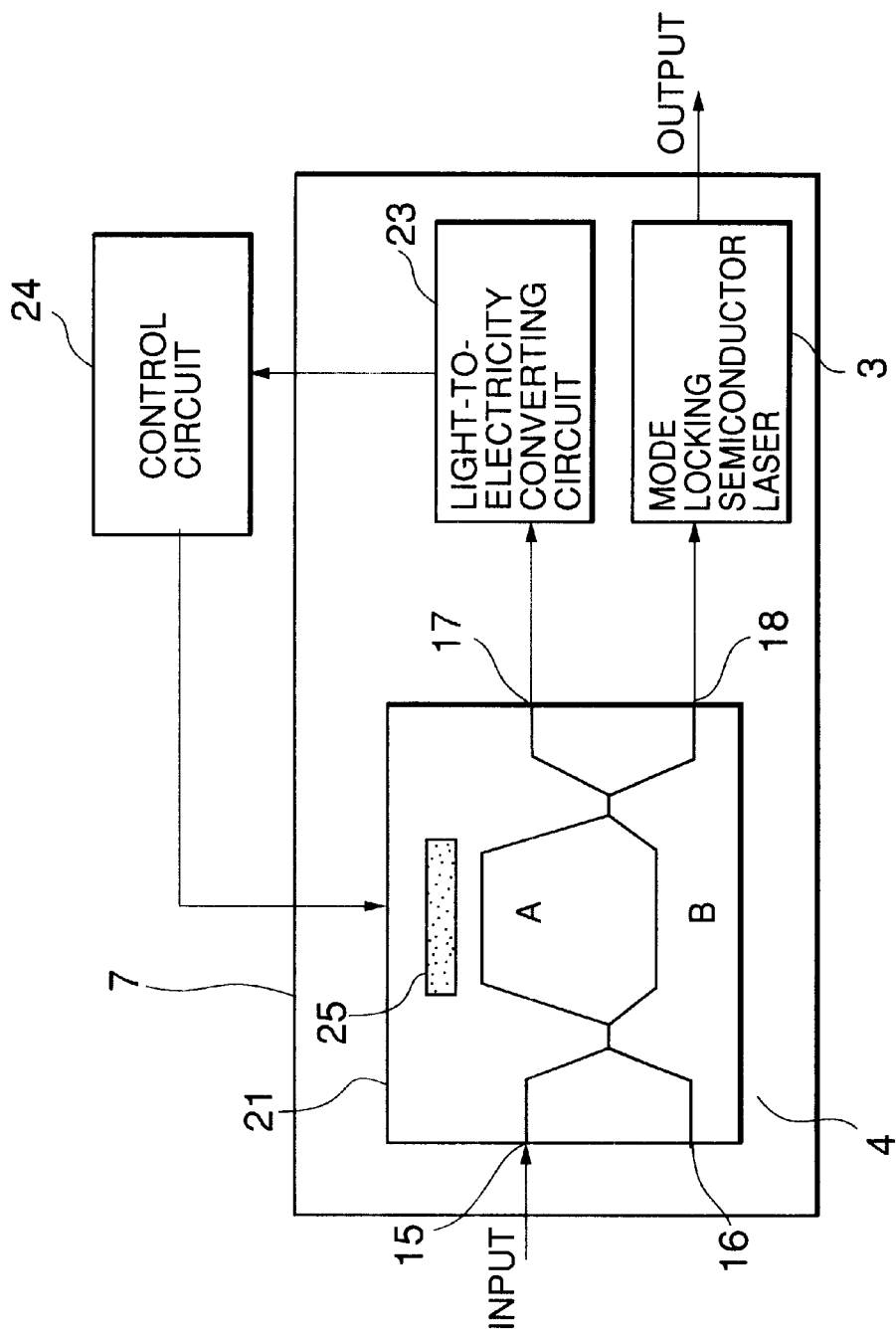

FIG. 9 shows another embodiment of the light timing circuit shown in FIG. 7. In the circuit shown in FIG. 9, an electrode 25, instead of the above-mentioned heater 26, is embedded in the optical waveguide substrate 4 to apply an electric field to at least one of the rays diverged from an incident light signal and propagated through their respective optical paths. FIG. 9 shows an example of the simplified circuit structure where one electrode 25 is located only above the waveguide A, whereas a plurality of electrodes may practically be used, one located above and another below the waveguide so as to apply the electric field effectively. Pin electrodes are also provided as required. When an incident NRZ light signal is input to the Mach-Zehnder interferometer 21, a light signal that is the above-mentioned intensity sum is output from the port 17 and a light signal that is the above-mentioned intensity difference is output from the port 18. The light signal of intensity sum from the port 17 is converted into an electric signal through the light-to-electricity converting circuit 23 and input to the control circuit 24. The control circuit 24 applies voltage to the electrode 25 to produce an electric field in order to optimize the interference condition of the light signal of intensity sum as monitored by the light-to-electricity converting circuit 23. By adjusting the intensity of the electric field thus produced, the phase adjustment is made for one of the rays diverged from the light signal, which is propagated through the optical path A. In this way, subtle control of the phase difference $\Delta \phi$ between the two propagated rays diverged from the light signal can be performed. If the control is performed to optimize the interference condition of the light signal of intensity sum output from the port 17, then a good and stable output of the light signal of intensity difference with a clock frequency component is made at the port 18. When the light signal including the clock frequency component output from the port 18 is input as incident light to the mode locking semiconductor laser 3, this laser 3 outputs light timing pulses at a cyclic frequency equivalent to the clock frequency. It is possible to use an alternative phase control method which ultrasonic waves are applied to the waveguide. Even when applying this method, an electrode is located along the waveguide as shown in FIG. 9. The interference condition control means using a heater or electrode is also applicable to the optical circuit structure shown in FIG. 4. In such arrangement shown in FIG. 5 that use half mirrors, the length of the optical paths is modified by the fine adjustment of the angle and position of the mirrors through the use of actuators.

As described above, the light timing circuit arrangements and light timing pulses generating method according to the present invention accomplish the generation of light timing pulses with high reliability and no large power consumption is required. These circuit arrangements according to such method have the control capability of optimizing the operation of the Mach-Zehnder interferometer and thus very stable circuit operation can be achieved.

While the present invention has been described in connection with certain preferred embodiments, it is to be understood that the subject matter encompassed by the present invention is not limited to those specific embodiments. On the contrary, it is intended to include all alternative, modifications, and equivalents as can be included within the spirit and scope of the following claims.

What is claimed is:

1. A method of generating light timing pulses from a light data signal comprising the steps of:
   making said light data signal diverge into two routes;
   regulating two diverged rays such that they travel through their specific optical paths with different path lengths; and
   combining said two diverged rays and generating light timing pulses from the composite light.

2. A method of generating light timing pulses from a light data signal comprising the steps of:
   making said light data signal diverge into two routes;
   producing a given propagation time difference between two diverged rays; and
   combining said two diverged rays and generating light timing pulses from the composite light.

3. The method of generating light timing pulses according to claim 1, wherein the light data signal is a non-return-to-zero type light data signal.

4. The method of generating light timing pulses according to claim 1, wherein the light timing pulses are generated from such part of said composite light that includes a clock frequency component equivalent to a bit rate of said light data signal.

5. The method of generating light timing pulses according to claim 1, wherein said two diverged rays are regulated such that the difference between the lengths of their optical paths is smaller than one bit length of the light data signal.

6. The method of generating light timing pulses according to claim 5, wherein said difference between the lengths of the optical paths $\Delta L$ is set such that a relation between itself and bit rate B of said light data signal will be $(m+0.05) \times Vc/B \leq \Delta L \leq (m+0.95) \times Vc/B$, where Vc is the light velocity in the optical paths and m is an integer.

7. The method of generating light timing pulses according to claim 1, wherein said composite light is input to a synchronous light pulses generating circuit.

8. The method of generating light timing pulses according to claim 7, wherein said synchronous light pulses generating circuit is an optical phase synchronization circuit.

9. The method of generating light timing pulses according to claim 7, wherein said synchronous light pulses generating circuit is a mode locking semiconductor laser.

10. A light timing circuit comprising:
    an optical circuit including a divergent section which makes an incident light data signal diverge into two routes, optical waveguides which form different-length optical paths through which the rays diverged from the incident light data signal are propagated, and a combining section which combines these diverged rays; and a synchronous light pulses generating circuit to which the rays output from the optical circuit are input.

11. The light timing circuit according to claim 10, wherein the difference between said optical paths is smaller than one bit length of the incident light data signal input to said optical circuit.

12. The light timing circuit according to claim 11, wherein said difference between the lengths of the optical paths $\Delta L$ is set such that a relation between itself and bit rate B of the incident light signal input to said optical circuit will be $(m+0.05) \times Vc/B \leq \Delta L \leq (m+0.95) \times Vc/B$, where $Vc$ is the light velocity in the optical paths and m is an integer.

13. The light timing circuit according to claim 10, wherein said optical circuit is a Mach-Zehnder-type optical circuit.

14. The light timing circuit according to claim 13, wherein said Mach-Zehnder-type optical circuit comprises 3-dB couplers.

15. The light timing circuit according to claim 14, wherein said 3-dB couplers are fusion-type optical fiber couplers.

16. The light timing circuit according to claim 10, wherein said optical circuit is constructed on an optical waveguide substrate.

17. The light timing circuit according to claim 10, wherein said optical circuit comprises half mirrors.

18. The light timing circuit according to claim 10, wherein said synchronous light pulses generating circuit is an optical phase synchronization circuit.

19. The light timing circuit according to claim 10, wherein said synchronous light pulses generating circuit is a mode locking semiconductor laser.

20. A light timing circuit comprising:

a Mach-Zehnder interferometer having two optical paths whose light data signal propagation time differs with each other;

a mode locking laser which generates light timing pulses in synchronization with a cyclic frequency of a light pulse signal output from the Mach-Zehnder interferometer;

means for monitoring the interference condition of the Mach-Zehnder interferometer; and interference condition control means for optimally controlling the condition of the Mach-Zehnder interferometer, based on the information derived from the monitoring means; wherein:

said Mach-Zehnder interferometer being set such that a relation between propagation time difference $\Delta T$ produced when two rays diverged from the light data signal are propagated through their respective optical paths and bit rate B of the light data signal will be $(m+0.05)/B \leq \Delta T \leq (m+0.95)/B$; and the propagation time difference $\Delta T$ of said Mach-Zehnder interferometer being set such that a phase difference $\Delta \phi$ between the two rays diverged from the light data signal when they are combined after being propagated through their respective optical paths will be integral multiples of radian $\pi$.

21. The light timing circuit according to claim 20, wherein the light data signal is a non-return-to-zero (NZR) type light signal.

22. The light timing circuit according to claim 20, wherein said interference condition control means for the Mach-Zehnder interferometer is defined as a means for setting said propagation time difference $\Delta T$ by changing the physical length of at least one of the two optical paths.

23. The light timing circuit according to claim 22, wherein said means for changing the physical length of at least one of the two optical paths is defined as a means for controlling the temperature of both or either of the two optical paths.

24. The light timing circuit according to claim 20, wherein said interference condition control means for the Mach-Zehnder interferometer is defined as a means for setting said propagation time difference $\Delta T$ by changing the refractive index of at least one of the two optical paths.

25. The light timing circuit according to claim 24, wherein said means for changing the refractive index of at least one of the two optical paths is defined as a means for controlling the temperature of both or either of the two optical paths.

26. The light timing circuit according to claim 20, wherein said interference condition control means for the Mach-Zehnder interferometer is defined as a combination of means for applying an electric field to at least one of the two optical paths and means for controlling the intensity of the electric field and said propagation time difference $\Delta T$ is adjusted by these combined means.

27. The light timing circuit according to claim 20, wherein said mode locking laser is a mode locking semiconductor laser.

28. The light timing circuit according to claim 20, wherein said Mach-Zehnder interferometer comprises 3-dB couplers.

29. The light timing circuit according to claim 20, wherein said Mach-Zehnder interferometer is constructed on an optical waveguide substrate.

* * * * *